UNITED STATES PATENT OFFICE.

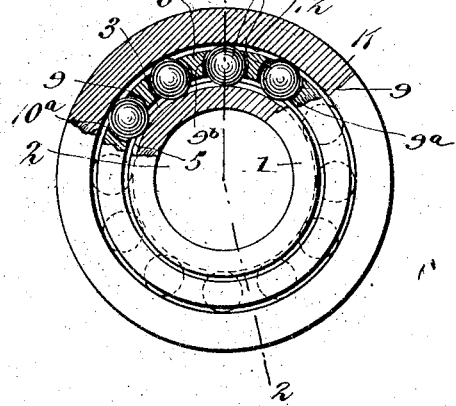

CLARK W. SALISBURY, OF JAMESTOWN, NEW YORK, ASSIGNOR TO SALISBURY BALL BEARING MFG. CO., OF JAMESTOWN, NEW YORK.

BALL-BEARING DEVICE.

1,058,629.     Specification of Letters Patent.     Patented Apr. 8, 1913.

Application filed October 15, 1912. Serial No. 725,901.

*To all whom it may concern:*

Be it known that I, CLARK W. SALISBURY, a citizen of the United States, residing at Jamestown, in the county of Chautauqua and State of New York, have invented new and useful Improvements in Ball-Bearing Devices, of which the following is a specification.

This invention relates to a ball bearing device which is adapted to be used in any form of rotary bearing and which in such a use, is interposed between the stationary and the movable parts of the bearing, the primary object of which being to provide a device of this character wherein the parts are of simple construction and are adapted to be readily assembled to form a compact anti-friction device.

A further object of the invention is the provision of a ball bearing device adapted especially for use in the hubs of wagons, automobiles, bicycles, or the like.

A still further object is to provide a device of this character including inner and outer members having outer and inner frusto-conical faces, respectively, and a frusto-conical ball retainer adapted to be interposed between both members and having a plurality of openings therein for the reception of anti-friction balls, the said balls being adapted to contact with the adjacent faces of both members. In constructing this device for use in either heavy or light vehicles, the inner and outer members, and the ball retainer, are made either long or short as the case may be, the number of circumferentially disposed rows of ball receiving openings in the retainer being thus limited to the requirements of usage.

A still further object is the provision of a ball bearing device of the construction set forth, wherein the inner member is provided at both ends with external peripheral flanges, and wherein the ball retainer is constructed so that its antifriction balls will be free for slight radial movement, thus permitting the balls to ride over the flange on the smaller end of the inner member, when the retainer is placed in position upon the inner member, the outer member serving, when inserted over the retainer, as effective means for maintaining the said balls in engagement with the bearing face of the inner member between the said flanges, so that the said flanges will coöperate with the extreme rows of the balls to limit the relative longitudinal movement of the retainer and inner member.

With these and other objects in view, the invention consists of certain novel features of construction, combination and arrangement of parts, as will be hereinafter described and claimed.

In the accompanying drawings:—Figure 1 is a fragmentary front elevation, showing a portion of the device in transverse section; Fig. 2 is a longitudinal sectional view, taken on the line 2—2 of Fig. 1; Fig. 3 is a side elevation of the ball retainer when the balls are removed; Fig. 4 is a side elevation of the inner member of the device; and Fig. 5 is a side elevation of the retainer when placed on its front face, the balls being mounted therein.

Referring to the drawings, the numeral 1 designates the inner, frusto-conical member, which is provided with a central opening 2 for the reception of the spindle of a vehicle axle, or a rotary shaft, in case the device is to be used in a shaft bearing. The member 1 is provided on its outer, tapered periphery and at either end thereof with a pair of spaced flanges 3 and 4, respectively, affording a bearing surface therebetween. A hollow frusto-conical ball retainer 6 is adapted to be fitted over the tapered faces 7 and 8 of the flanges 3 and 4, respectively on the member 1, and is provided with a plurality of ball-receiving openings 9, having their inner ends provided with annular limiting flanges 9$^a$ whose inner faces are curved as at 9$^b$ so as to evenly engage the spherical faces of the balls and limit the inward movement thereof within the openings 9. These openings 9 are arranged preferably in longitudinal and circumferentially extending rows and are evenly spaced, relatively. A plurality of anti-friction balls 10 are mounted within the openings 9 in the retainer 6, so as to be engageable with the bearing surface 5 of the member 1, the said balls being free for slight radial movement and retained in position within the openings 9 by the provision of burs 10$^a$ which are in-struck from the outer edges of the said openings. A hollow, outer member 11, whose outer face is cylindrical and whose inner, active face 12 is tapered, is adapted to be inserted over the retainer 6 and the balls carried thereby, and when in this position the bearing face 12 of the member 11 evenly contacts with the faces of the balls 10 as the central opening of the member 11 is sufficiently larger in mean diameter than the mean external diameter of the retainer. This outer member serves to maintain the balls in engagement with the bearing face of the inner member between the flanges thereof so that the latter will coöperate with the balls to limit the relative longitudinal movement of the inner member and the retainer.

In the manufacture of ball bearing devices of the character described, they are constructed in different lengths, so that the different numbers of circumferential rows of balls may be employed as required by usage in different capacities. It should thus be apparent that the same size of hub may be used in the wheels of vehicles of different weights, and that a ball bearing device of the required length may be used in each particular case so as to meet the requirements and yet obviating the necessity of making different sized hubs, as would be the case were the balls employed in the different ball bearing devices made of different sizes.

From the above description, taken in connection with the accompanying drawings, it will be seen that I have provided a ball bearing device whose features of construction render the same peculiarly adapted for the use intended, which may be readily assembled, and which will be so efficient and so cheaply manufactured as to insure practically unlimited use of the device in the art to which it pertains.

Having thus described my invention, what I claim is:—

1. In an anti-friction bearing an inner member having spaced flanges upon its outer periphery, said member affording a continuous and unbroken bearing surface between the flanges, a hollow retainer positioned around said inner member and provided with a plurality of series of openings for receiving anti-friction elements, a plurality of series of anti-friction elements secured in the openings and having slight radial movement therein to permit assembling of said parts, said elements bearing against the bearing surface between the flanges and coöperating with said flanges to limit the relative axial movement of the retainer and inner member, and a hollow outer member bearing against the anti-friction elements to hold them against the inner member and between the flanges.

2. In an anti-friction bearing an inner frusto-conical member having spaced flanges upon its outer periphery, said member affording a continuous and unbroken bearing surface between the flanges, a hollow frusto-conical retainer positioned around said inner member and provided with a plurality of series of openings for receiving anti-friction elements, a plurality of series of anti-friction elements secured in the openings, the elements of one of said series having slight radial movement within the openings to permit assembling of said inner member and retainer, said elements bearing against the bearing surface between the flanges and coöperating with said flanges to limit the relative axial movement of the retainer and inner member, and a hollow outer member bearing against the anti-friction elements to hold them against the inner member and between the flanges.

3. In an anti-friction bearing an inner frusto-conical member having spaced flanges upon its outer periphery, said member affording a continuous and unbroken bearing surface between the flanges, a hollow frusto-conical retainer positioned around said inner member and provided with a plurality of series of openings for receiving anti-friction balls, a plurality of series of anti-friction balls secured in the openings, the balls of one of said series having slight radial movement within the openings to permit assembling of said inner member and retainer, said balls bearing against the bearing surface between the flanges and coöperating with said flanges to limit the relative axial movement of the retainer and inner member, and a hollow outer member bearing against the anti-friction balls to hold them against the inner member and between the flanges.

In testimony whereof I affix my signature in presence of two witnesses.

CLARK W. SALISBURY.

Witnesses:
 DUDLEY B. HOWARD,
 BENNETT S. JONES.